US012161984B2

(12) United States Patent
Müller et al.

(10) Patent No.: US 12,161,984 B2
(45) Date of Patent: Dec. 10, 2024

(54) CONTAINER AND DISPENSER FOR VISCOUS MATERIALS

(71) Applicant: Shin-Etsu Silicones Europe B.V., Wiesbaden (DE)

(72) Inventors: Gerhard Müller, Aichtal (DE); Kin Saito, Frankfurt am Main (DE); Makoto Ohara, Frankfurt am Main (DE); Dennis Tenhündfeld, Wiesbaden (DE); Andreas Schell, Vilgertshofen (DE)

(73) Assignee: SHIN-ETSU SILICONES EUROPE B.V., Wiesbaden (DE)

( * ) Notice: Subject to any disclaimer, the term of this patent is extended or adjusted under 35 U.S.C. 154(b) by 289 days.

(21) Appl. No.: 16/618,858

(22) PCT Filed: Jun. 6, 2018

(86) PCT No.: PCT/EP2018/064939

§ 371 (c)(1),
(2) Date: Dec. 3, 2019

(87) PCT Pub. No.: WO2018/224570

PCT Pub. Date: Dec. 13, 2018

(65) Prior Publication Data

US 2020/0164323 A1 May 28, 2020

(30) Foreign Application Priority Data

Jun. 6, 2017 (DE) ..................... 10 2017 112 440.3

(51) Int. Cl.

| | |
|---|---|
| ***B65D 81/32*** | (2006.01) |
| ***B01F 25/431*** | (2022.01) |
| ***B01F 25/432*** | (2022.01) |
| ***B01F 33/501*** | (2022.01) |

(Continued)

(52) U.S. Cl.
CPC ...... *B01F 35/522* (2022.01); *B01F 25/43161* (2022.01); *B01F 25/4321* (2022.01);
(Continued)

(58) Field of Classification Search
CPC .................................................. B65D 81/3261
(Continued)

(56) References Cited

U.S. PATENT DOCUMENTS

| | | | | |
|---|---|---|---|---|
| 4,002,289 A | | 1/1977 | Moore | |
| 4,511,533 A | * | 4/1985 | Guadagno ................ | C12Q 1/28 436/66 |

(Continued)

FOREIGN PATENT DOCUMENTS

| | | | |
|---|---|---|---|
| EP | 2724788 | A1 | 4/2014 |
| WO | 2014/090507 | A1 | 6/2014 |
| WO | 2016/092359 | A2 | 6/2016 |

OTHER PUBLICATIONS

International Search Report and Written Opinion of the International Searching Authority for PCT/EP2018/064939 filed Jun. 6, 2018.

*Primary Examiner* — David L Sorkin
(74) *Attorney, Agent, or Firm* — ProPat, LLC; Cathy R. Moore

(57) ABSTRACT

A container for two or more viscous materials is provided that contains a reservoir, one or more mixing tube(s) and frame or shield, with one or more apertures arranged within the mixing tube. The container can include a frame and a first and second polymeric film joined to a first and, respectively second surface of the frame by one or more adhesive or seal seams.

23 Claims, 13 Drawing Sheets

(51) Int. Cl.

| | |
|---|---|
| ***B01F 35/00*** | (2022.01) |
| ***B01F 35/513*** | (2022.01) |
| ***B01F 35/52*** | (2022.01) |
| ***B01F 35/71*** | (2022.01) |
| *B01F 35/30* | (2022.01) |

(52) U.S. Cl.
CPC ...... *B01F 33/50111* (2022.01); *B01F 35/513* (2022.01); *B01F 35/561* (2022.01); *B01F 35/7131* (2022.01); *B01F 35/7174* (2022.01); *B01F 35/71795* (2022.01); *B01F 35/71805* (2022.01); *B65D 81/3233* (2013.01); *B65D 81/3261* (2013.01); *B01F 25/43163* (2022.01); *B01F 25/431971* (2022.01); *B01F 25/431972* (2022.01); *B01F 2035/351* (2022.01)

(58) Field of Classification Search
USPC ....................... 366/181.5, 336–340; 206/219
See application file for complete search history.

(56) References Cited

U.S. PATENT DOCUMENTS

| | | | | |
|---|---|---|---|---|
| 5,492,219 | A * | 2/1996 | Stupar | B65D 81/3266 206/219 |
| 5,516,209 | A | 5/1996 | Flint et al. | |
| 5,826,977 | A | 10/1998 | Fowler et al. | |
| 2006/0151531 | A1 | 7/2006 | Tikusis | |
| 2008/0002521 | A1 | 1/2008 | Hosozawa et al. | |
| 2008/0123465 | A1* | 5/2008 | Heusser | B65D 81/3261 366/130 |
| 2009/0114677 | A1 | 5/2009 | Stewart | |
| 2011/0017771 | A1 | 1/2011 | Obrsit et al. | |
| 2011/0048998 | A1* | 3/2011 | Riccio | B32B 27/304 428/480 |
| 2015/0175284 | A1 | 6/2015 | Sharp et al. | |
| 2015/0343485 | A1* | 12/2015 | Ettlin | B01F 35/71795 222/145.5 |

* cited by examiner

CONTAINER AND DISPENSER FOR VISCOUS MATERIALS

CROSS-REFERENCE TO RELATED APPLICATIONS

This application is being filed under 35 U.S.C. § 371 as a National Stage Application of pending International Application No. PCT/EP2018/064939 filed Jun. 6, 2018, which claims priority to the following parent application: German Patent Application No. 10 2017 112 440.3, filed Jun. 6, 2017. Both International Application No. PCT/EP2018/064939 and German Patent Application No. 10 2017 112 440.3 are hereby incorporated by reference herein in their entirety.

FIELD OF THE INVENTION

The present invention pertains to a container, comprising a reservoir and one or more mixing tubes, wherein the reservoir contains two or more viscous materials and the at least one mixing tube comprises a sleeve that is composed of one or more films consisting of polymeric materials, and a dispenser for said container.

BACKGROUND OF THE INVENTION

Containers for storage and dispensing of two or more viscous materials that are to be mixed shortly before or during application are known in the state of the art.

The company Sulzer AG offers cartridges and dispensers for two viscous components such as curable alginates for dental impressions under the product names MIXPAC™ T-Mixer Colibri, MIXPACTM™ T-Mixer, Unit Dose 0.5 ml, Helix™ and QUADROTM™.

U.S. Pat. No. 4,002,289 describes a static mixer with two shells and a film tube or two flat films that are arranged between the two shells. The faces of the two shells adjacent to the film tube or flat films have a first and, respectively second channel that are mutually congruent. Each the first and second channel are shaped as two scrossing waves.

U.S. Pat. No. 5,516,209 pertains to a static mixing device with a mixing conduit and a reusable housing. The mixing conduit is comprised of two layers of flexible material, in particular a thermoplastic elastomer. The mixing conduit may comprise an intermediate layer equipped with apertures dividing the inner volume of the mixing conduit into a first and second region, wherein viscous materials that are to be mixed can flow through the apertures from the first to the second region and vice versa.

WO 2016/092359 A2 discloses a static mixer for two flowable components with a housing comprising a mixing channel and a film tube extending from an inlet of the mixing channel to an outlet thereof, wherein the mixing channel is equipped with at least one mixing element.

The packages, respectively containers of the prior art exhibit one or several of the beneath recited drawbacks:

- the containers for the viscous components are thick walled cartridges made of plastic that are expensive compared to packaging film and after use constitute a considerable waste volume;
- the static mixer has a complex shape and comprises two or more plastic parts such as a thick walled sleeve tube, a spiral shaped insert and an outer mounting thread for a cartridge, which are manufactured by injection moulding at corresponding cost and increase waste volume;

- in order to reduce cost the containers for the viscous components, particularly cartridges are dimensioned for multiple applications, such that before a first application the container seal is breached and the viscous components are exposed to ambient air and are subject to accelerated aging;
- with packages comprising a static mixer that are dimensioned for multiple applications, after a first application cured residue of the mixed components remains in the static mixer, which therefore must be replaced;

SUMMARY OF ADVANTAGEOUS EMBODIMENTS OF THE INVENTION

- the static mixer has a sizeable inner volume, such that after use a substantial portion of the compounds that are to be mixed remain as residue;
- in film packages with integrated static mixer the two or more materials that are to be dispensed are insufficiently mixed.

The present invention has the object to overcome the above stated drawbacks and to provide a single-use container for storage, intensive mixing and dispensing of two or more viscous materials.

This object is attained by a container comprising a reservoir and one or more mixing tubes, wherein the reservoir contains two or more viscous materials, the at least one mixing tube comprises a sleeve consisting of one ore more films made of polymeric materials and the mixing tube contains a shield with m apertures with $1 \le m \le 160$.

The object of the invention is also achieved by a container comprising a reservoir and one or more mixing tubes, wherein the reservoir contains two or more viscous materials and the at least one mixing tube comprises a sleeve consisting of one ore more films made of polymeric materials, the container comprises a frame with m apertures arranged within the at least one mixing tube or the at least one mixing tube contains a shield with m apertures and m is in the range from 1 to 160 ($1 \le m \le 160$).

Advantageous embodiments of the inventive container are characterized, in that

- the shield comprises one aperture (m=1);
- the shield comprises m apertures with $4 \le m \le 160$;
- the shield comprises m apertures with $4 \le m \le 20$, $10 \le m \le 30$, $20 \le m \le 40$, $30 \le m \le 50$, $40 \le m \le 60$, $50 \le m \le 70$, $60 \le m \le 80$, $70 \le m \le 90$, $80 \le m \le 100$, $90 \le m \le 110$, $100 \le m \le 120$, $110 \le m \le 130$, $120 \le m \le 140$, $130 \le m \le 150$ or $140 \le m \le 160$;
- the frame comprises one aperture (m=1) arranged within the mixing tube;
- the frame comprises m apertures arranged within the mixing tube with $4 \le m \le 160$;
- the frame comprises m apertures arranged within the mixing tube with $4 \le m \le 20$, $105 \le m \le 30$, $20 \le m \le 40$, $30 \le m \le 50$, $405 \le m \le 60$, $505 \le m \le 70$, $605 \le m \le 80$, $70 \le m \le 90$, $805 \le m \le 100$, $905 \le m \le 110$, $100 \le m \le 120$, $110{:}5 \le m \le 130$, $120 \le m \le 140$, $130 \le m \le 150$ or $140 \le m \le 160$;
- the container comprises one or more outlets;
- the at least one mixing tube is arranged between the reservoir and the at least one outlet;
- the at least one outlet is equipped with a closure configured as breakable adhesive or seal seam;
- the burst pressure of the closure is ≥1 bar, ≥1.5 bar, ≥2 bar or ≥3 bar;
- the container comprises one or more retainer chambers;

the container comprises one or more retainer chambers connected to the at least one mixing tube;
the container comprises one or more retainer chambers connected to the at least one mixing tube proximal to the at least one outlet;
the container comprises one or more retainer chambers and at least one outlet equipped with a breakable closure configured as breakable adhesive or seal seam and an aperture of the at least one retainer chamber is arranged between the at least one mixing tube and the closure of the outlet;
the at least one retainer chamber is arranged peripherally relative to a volume region extending between the mixing tube and the outlet;
the at least one retainer chamber has a volume of 1 to 5 ml;
the mixing tube comprises a sleeve comprised of two or more films of polymeric materials joined by one or more adhesive or seal seams;
the mixing tube comprises a sleeve formed of a first and second polymeric films joined to a first and second surface of the frame each by one or more adhesive or seal seams;
the mixing tube comprises a sleeve formed of a first and second polymeric films joined to a first and second surface of the frame each by one or more adhesive or seal seams and the first and second polymeric have an elongation at break of 10% to 700%, measured according to DIN EN ISO 527-1:2012-06;
the mixing tube comprises a sleeve formed of a first and second polymeric films joined to a first and second surface of the frame each by one or more adhesive or seal seams and the first and second polymeric have an elongation at break of 10% to 60%, 40% to 80%, 60% to 100%, 80% to 120%, 100% to 140%, 120% to 160%, 140% to 180%, 160% to 200%, 180% to 260%, 220% to 300%, 260% to 340%, 300% to 380%, 340% to 420%, 420% to 500%, 460% to 540%, 500% to 580%, 540% to 620%, 580% to 660% or 620% to 700%, measured according to DIN EN ISO 527-1:2012-06;
the container comprises a frame and a first and second polymeric film joined to a first and, respectively second surface of the frame each by one or more adhesive or seal seams;
the container comprises a frame and a first and second polymeric film joined to a first and, respectively second surface of the frame each by one contiguous adhesive or seal seam;
the container comprises a frame and a first and second polymeric film joined to a first and, respectively second surface of the frame each by one or more adhesive or seal seams, each the first and second polymeric film having an elongation at break of 10% to 700%, measured according to DIN EN ISO 527-1:2012-06;
the container comprises a frame and a first and second polymeric film joined to a first and, respectively second surface of the frame each by one or more adhesive or seal seams, the first and second polymeric film having an elongation at break of 10% to 60%, 40% to 80%, 60% to 100%, 80% to 120%, 1000/to 140%, 120% to 160%, 140% to 180%, 160% to 200%, 180% to 260%, 220% to 300%, 260% to 340%, 300% to 380%, 340% to 420%, 420% to 500%, 460% to 540%, 500% to 580%, 540% to 620%, 580% to 660% or 620% to 700%, measured according to DIN EN ISO 527-1: 2012-06;
the shield is force-fit bonded to the mixing tube at least at one section of the mixing tube;
the shield is bonded to the mixing tube through one or more adhesive or seal seams;
the shield consists of a polymeric material;
the shield consists of a polymeric material and is equipped with one or more coatings of thermoplastic polymeric materials;
the shield has a length of 20 to 100 mm, 20 to 80 mm, 20 to 60 mm or 20 to 40 mm;
the shield has a thickness of 0.3 to 3 mm, of 0.4 to 2 mm, of 0.4 to 1 mm or 0.4 to 0.8 mm, measured according to DIN 53370:2006;
m is an even number and the apertures of the shield are arranged pairwise, such that two apertures each are situated side by side;
m is an even number and the apertures of the shield are arranged in two rows, such that two apertures each are situated side by side;
m is an even number and the apertures of the shield are arranged in two rows with straight or curved course, such that two apertures each are situated side by side;
m is a number that is divisable by four;
the container comprises a sleeve consisting of one or more films of polymeric materials;
the container comprises a sleeve consisting of two or more films of polymeric materials joined by one or more adhesive or seal seams;
the reservoir comprises a sleeve consisting of two or more films of polymeric materials;
the reservoir comprises a sleeve consisting of two or more films of polymeric materials joined by one or more adhesive or seal seams;
the reservoir comprises two or more chambers, each chamber independently having a volume of 20 to 40≤ml or 30 to 50≤ml;
the reservoir comprises two or more chambers, each chamber contains a viscous material and a breakable adhesive or seal seam is arranged between each chamber and the at least one mixing tube;
the burst pressure of the breakable adhesive or seal seams is ≥1 bar, ≥1.5 bar, ≥2 bar or ≥3 bar;
the reservoir comprises two or more chambers, each chamber contains a viscous material and an openable fastener is arranged between each chamber and the at least one mixing tube;
the openable fastener is configured as a clamp;
the openable fastener is configured as a press-on closure and comprises one or more profile flutes and one or more profile tongues;
the openable fastener is configured as a zip lock and comprises one or more pairs of interlocking profiles and one or more sliders;
an adhesive or seal seam is arranged between each two chambers of the reservoir;
a mechanical closure is arranged between each two chambers of the reservoir;
each of the viscous materials is encased in a breakable sleeve;
each of the viscous materials is encased in a breakable sleeve, the breakable sleeve consisting of one or more films of polymeric materials;
each of the viscous materials is encased in a breakable sleeve, the breakable sleeve consisting of two or more films of polymeric materials joined by adhesive or seal seams;

the burst pressure of the breakable sleeve is ≥1 bar, ≥1.5 bar, ≥2 bar or ≥3 bar;

each of the viscous materials is encased in a breakable tube consisting of a film made from one or more polymeric materials;

each of the viscous materials is encased in a breakable tube consisting of a monolayer film made from a polymeric material;

each of the viscous materials is encased in a breakable tube consisting of a multilayer film, wherein each layer is made from a polymeric material;

each of the viscous materials is encased in a breakable tube comprising one or more barrier coatings made from a material selected from aluminum oxide and silicon oxide;

each of the viscous materials is encased in a breakable tube comprising one or more barrier layers comprising one or more polymers selected from polyvinylidene chloride (PVdC), ethylene vinyl alcohol (EVOH) and polychlorotrifluoroethylene (PCTFE);

each of the viscous materials is encased in a breakable tube and each a first and second end of the breakable tube is closed by a polymer or metal clip;

the burst pressure of the breakable tube is ≥1 bar, ≥1.5 bar, ≥2 bar or ≥3 bar;

the container comprises a frame;

the frame consists of a polymeric material;

the frame consists of a polymeric material and is equipped with one or more coatings of thermoplastic polymeric materials;

the frame and the shield are configured as a one-piece entity;

the frame and the shield are made from one piece of sheet material;

the frame and the shield are made from a one-piece film of polymeric material;

the frame is made from a polymeric film having an elastic modulus of 1500 to 4500 $N\cdot mm^{-2}$, measured according to DIN EN ISO 527:2012;

the frame is made from a polymeric film having an elastic modulus of 1500 to 1900 $N\cdot mm^{-2}$, 1700 to 2100 $N\cdot mm^{-2}$, 1900 to 2300 $N\cdot mm^{-2}$, 2100 to 2500 $N\cdot mm^{-2}$, 2300 to 2700 $N\cdot mm^{-2}$, 2500 to 2900 $N\cdot mm^{-2}$, 2700 to 3100 $N\cdot mm^{-2}$, 2900 to 3300 $N\cdot mm^{-2}$, 3100 to 3500 $N\cdot mm^{-2}$, 3300 to 3700 $N\cdot mm^{-2}$, 3500 to 3900 $N\cdot mm^{-2}$, 3700 to 4100 $N\cdot mm^{-2}$, 3900 to 4300 $N\cdot mm^{-2}$ or 4100 to 3500 $N\cdot mm^{-2}$, measured according to DIN EN ISO 527:2012;

the frame is made from a polymeric film having a bending stiffness of 60 to 200 N·mm, measured according to DIN 53350;

the frame is made from a polymeric film having a bending stiffness of 60 to 100 N·mm, 80 to 120 N·mm, 100 to 140 N·mm, 120 to 160 N·mm, 140 to 180 N·mm or 160 to 200 N·mm, measured according to DIN 53350;

the frame is made from a polymeric film having a bending stiffness of $140\cdot t^3$ to $350\cdot t^3$ $N\cdot mm^{-2}$, wherein t is the thickness of the polymeric film in units of mm and the bending stiffness is measured according to DIN 53350;

the frame is made from a polymeric film having a bending stiffness of $140\cdot t^3$ to $200\cdot t^3$ $N\cdot mm^{-2}$, $170\cdot t^3$ to $230\cdot t^3$ $N\cdot mm^{-2}$, $200\cdot t^3$ to $260\cdot t^3$ $N\cdot mm^{-2}$, $230\cdot t^3$ to $290\cdot t^3$ $N\cdot mm^{-2}$, $260\cdot t^3$ to $320\cdot t^3$ $N\cdot mm^{-2}$ or $290\cdot t^3$ to $350\cdot t^3$ N/mm, wherein t is the thickness of the polymeric film in units of mm and the bending stiffness is measured according to DIN 53350;

the frame is made from a polymeric film having a thickness of 0.3 to 3 mm, 0.4 to 2 mm, 0.4 to 1 mm or 0.4 to 0.8 mm, measured according to DIN 53370:2006;

the frame has a thickness 0.3 to 3 mm, of 0.4 to 2 mm, of 0.4 to 1 mm or 0.4 to 0.8 mm, measured according to DIN 53370:2006;

the mixing tube comprises a sleeve consisting of two or more films of polymeric materials joined to the frame by one or more adhesive or seal seams;

the frame comprises m apertures arranged between the one or more adhesive or seal seams of the mixing tube with 1≤m≤160;

the frame comprises m apertures arranged proximal to the one or more adhesive or seal seams of the mixing tube with 1≤m≤160;

the frame comprises one aperture arranged between the one or more adhesive or seal seams of the mixing tube;

the frame comprises one aperture arranged proximal to the one or more adhesive or seal seams of the mixing tube;

the container comprises one mixing tube comprising one or more polymeric films joined to the frame by one or more adhesive or seal seams and m apertures arranged in the frame proximal to the one or more adhesive or seal seams with 1≤m≤160;

the container comprises one mixing tube comprising one or more polymeric films joined to the frame by one or more adhesive or seal seams and one aperture which extends alongside and proximal to the adhesive or seal seams;

the reservoir comprises a sleeve consisting of two or more films of polymeric materials joined to the frame by one or more adhesive or seal seams;

the frame comprises two or more apertures for accommodation of viscous materials, the two or more apertures arranged between the one or more adhesive or seal seams of the reservoir;

the frame comprises two or more apertures for accommodation of viscous materials, the two or more apertures arranged proximal to the one or more adhesive or seal seams of the reservoir;

the frame comprises a first and second aperture for accommodation of a first and, respectively second viscous material, the first and second aperture arranged between the one or more adhesive or seal seams of the reservoir;

the frame comprises a first and second aperture for accommodation of a first and, respectively second viscous material, the first and second aperture arranged proximal to the one or more adhesive or seal seams of the reservoir;

the frame comprises two or more apertures for accommodation of two or more casings each containing a viscous material and each of the apertures has an edge with a sawtooth-shaped section;

the frame comprises two or more apertures for accommodation of two or more casings each containing a viscous material, the two or more apertures arranged between the one or more adhesive or seal seams of the reservoir;

the frame comprises two or more apertures for accommodation of two or more casings each containing a viscous material, the two or more apertures arranged proximal to the one or more adhesive or seal seams of the reservoir;

the frame comprises a first and second aperture for accommodation of a first and, respectively second casing containing a first and, respectively second viscous material, the first and second aperture arranged between the one or more adhesive or seal seams of the reservoir;

the frame comprises a first and second aperture for accommodation of a first and, respectively second casing containing a first and, respectively second viscous material, the first and second aperture arranged proximal to the one or more adhesive or seal seams of the reservoir;

the reservoir comprises a first and second chamber for a first and, respectively second viscous material and the mixing tube is arranged between the first and second chamber;

the reservoir comprises a first and second chamber for a first and, respectively second viscous material, the first and second chamber each comprised of a first and, respectively second aperture arranged in the frame and one or more polymeric films joined to the frame by one or more adhesive or seal seams;

the reservoir comprises a first and second chamber for a first and, respectively second viscous material, the first and second chamber each comprised of a first and, respectively second aperture arranged in the frame and one or more polymeric films joined to the frame by one or more adhesive or seal seams arranged in a partially circumferential pattern around the first and, respectively second aperture;

the reservoir comprises a first and second chamber for a first and, respectively second viscous material, the first and second chamber each comprised of a first and, respectively second aperture arranged in the frame and one or more polymeric films joined to the frame by one or more adhesive or seal seams arranged in a fully circumferential pattern around the first and, respectively second aperture;

the container comprises a sleeve consisting of two or more films of polymeric materials joined to the frame by one or more adhesive or seal seams; and/or one, two or more of the viscous materials independently consist of 80 to 100 weight-% of silicone and 0 to 20 weight-% additives, based on the total weight of the respective material.

The frame provides the container mechanical stability. Therefore, the frame is preferably made from a polymeric monolayer or multilayer film having an elastic modulus of 1500 to 4500 $N \cdot mm^{-2}$ and commensurate bending stiffness.

The sleeve of the mixing tube is extendible (stretchable) so that it can conform to a multitude of protrusions, deflectors or baffles arranged in an external mixing channel of a dispenser. Therefore, the sleeve of the mixing tube is preferably made from a polymeric film having an elongation at break in the range from 10% to 700%. In expedient embodiments of the inventive container, the container sleeve in its entirety is made from a polymeric film having an elongation at break in the range from 10% to 700%.

The invention has the further object to provide a reusable dispenser for the above described container, which enables intensive mixing and dispensing with minor residue of the materials that are to be dispensed remaining in the dispenser.

This object is achieved through a dispenser for a container with the above described features, wherein the dispenser comprises one or more static mixers configured to accommodate at least one mixing tube of the container, the at least one static mixer comprising a first mixer part with a first channel and a second mixer part with a second channel, the first and second mixer part shaped in such manner, that the mixing tube and a therein contained shield are form-fit mateable to the first and second mixer part and the first and second channel are meander-shaped.

In a second dispenser embodiment the second object of the invention is also achieved through a dispenser for a container with the above described features, wherein the dispenser comprises one or more static mixers configured to accommodate at least one mixing tube of the container, the at least one static mixer comprising a first mixer part with a first channel and a second mixer part with a second channel, the first and second mixer part shaped in such manner, that the mixing tube and a frame of the container with a therein arranged mixing aperture are form-fit mateable to the first and second mixer part and the first and second channel are meander-shaped.

Advantageous embodiments of the inventive dispenser are characterized, in that the first and second mixer part are shaped in such manner, that the mixing tube and the therein contained shield are form-fit mateable to and between the first and second mixer part;

the first and second mixer part are shaped in such manner, that the mixing tube and the frame of the container with a therein arranged mixing aperture are form-fit mateable to and between the first and second mixer part;

the first and second channel each comprise 1 to 40 meander cells;

the first and second channel have meandering courses of opposite phase;

the first and second channel comprise 4 to 160 congruent sections;

the first and second channel comprise 4 to 160 sections that are congruent to apertures in the shield;

the first and second channel each have a length of 20 to 100 mm, 20 to 80 mm, 20 to 60 mm or 20 to 40 mm;

the meander cells of the first and second channel independently have a length of 5 to 15 mm;

the first and second mixer part with the thereto form-fit mated shield bound a fluid-conducting mixing chamber;

the first and second channel with the thereto force-fit mated mixing tube and shield bound a fluid-conducting mixing chamber;

the first and second channel with the thereto force-fit mated shield bound a fluid-conducting mixing chamber having a length of 20 to 100 mm, 20 to 80 mm, 20 to 60 mm or 20 to 40 mm;

the first and second channel with the thereto force-fit mated mixing tube and shield bound a fluid-conducting mixing chamber having a length of 20 to 100 mm, 20 to 80 mm, 20 to 60 mm or 20 to 40 mm;

the first and second channel with the thereto force-fit mated shield bound a fluid-conducting mixing chamber having an average inner volume of 0.15 to 1.8 ml, 0.15 to 1.5 ml or 0.15 to 1 ml per each 10 mm length;

the first and second channel with the thereto force-fit mated mixing tube and shield bound a fluid-conducting mixing chamber having an average inner volume of 0.15 to 1.8 ml, 0.15 to 1.5 ml or 0.15 to 1 ml per each 10 mm length;

the first and second mixer part with the thereto form-fit mated shield bound n mixing cells with $2 \leq n \leq 80$ wherein each mixing cell comprises a first and second inlet and a first and second outlet, the outlets of the j-th mixing cell with $1 \leq j \leq n-1$ are connected to the inlets of the (j+1)-th mixing cell and within each mixing cell conduits from each the first and second inlet to each the first and second outlet practically have the same length and shape;

the first and second mixer part with the thereto form-fit mated mixing tube and shield bound n mixing cells with 2≤n≤80 wherein each mixing cell comprises a first and second inlet and a first and second outlet, the outlets of the j-th mixing cell with 1≤j≤n−1 are connected to the inlets of the (j+1)-th mixing cell and within each mixing cell conduits from each the first and second inlet to each the first and second outlet practically have the same length and shape;

the first and second mixer part with the thereto form-fit mated frame of the container bound a fluid-conducting mixing chamber;

the first and second channel with the thereto form-fit mated mixing tube and frame of the container bound a fluid-conducting mixing chamber;

the first and second channel with the thereto form-fit mated frame of the container bound a fluid-conducting mixing chamber having a length of 20 to 100 mm, 20 to 80 mm, 20 to 60 mm or 20 to 40 mm;

the first and second channel with the thereto form-fit mated mixing tube and frame of the container bound a fluid-conducting mixing chamber having a length of 20 to 100 mm, 20 to 80 mm, 20 to 60 mm or 20 to 40 mm;

the first and second channel with the thereto form-fit mated frame of the container bound a fluid-conducting mixing chamber having an average inner volume of 0.15 to 1.8 ml, 0.15 to 1.5 ml or 0.15 to 1 ml per each 10 mm length;

the first and second channel with the thereto form-fit mated mixing tube and frame of the container bound a fluid-conducting mixing chamber having an average inner volume of 0.15 to 1.8 ml, 0.15 to 1.5 ml or 0.15 to 1 ml per each 10 mm length;

the first and second mixer part with the thereto form-fit mated frame of the container bound n mixing cells with 2≤n≤80 wherein each mixing cell comprises a first and second inlet and a first and second outlet, the outlets of the j-th mixing cell with 1≤j≤n−1 are connected to the inlets of the (j+1)-th mixing cell and within each mixing cell conduits from each the first and second inlet to each the first and second outlet practically have the same length and shape;

the first and second mixer part with the thereto form-fit mated mixing tube and frame of the container bound n mixing cells with 2≤n≤80 wherein each mixing cell comprises a first and second inlet and a first and second outlet, the outlets of the j-th mixing cell with 1≤j≤n−1 are connected to the inlets of the (j+1)-th mixing cell and within each mixing cell conduits from each the first and second inlet to each the first and second outlet practically have the same length and shape;

the dispenser comprises one or more retainer chambers;

the at least one retainer chamber is arranged peripherally relative to the first and second channel;

the dispenser comprises a two-part container chamber;

the container chamber comprises a bottom part and a lid;

the lid of the container chamber is pivotably hinged on the bottom part;

the dispenser comprises an actuator for excerting pressure on the reservoir of the container and the therein contained viscous materials;

the dispenser comprises a punch for excerting pressure on the reservoir of the container and the therein contained viscous materials;

the dispenser comprises a roller for excerting pressure on the reservoir of the container and the therein contained viscous materials;

the dispenser comprises an electric drive for actuator activation;

the dispenser comprises an electrically driven screw for actuator activation;

the dispenser comprises a manually operable lever device for excerting pressure on the reservoir of the container and the therein contained viscous materials;

the dispenser comprises an electrically driven lever device for excerting pressure on the reservoir of the container and the therein contained viscous materials; and/or the dispenser comprises a knee lever for excerting pressure on the reservoir of the container and the therein contained viscous materials.

In a third dispenser embodiment, the second object of the invention is achieved through a dispenser comprising an electrically or manually operable drive;

at least one mechanical or hydraulic power transmission;

a first and second plunger;

the power transmission configured to translate drive motion into first and second plunger motion;

a first and second receptacle $R_1$ and $R_2$ for a first and, respectively second viscous material, each receptacle $R_1$ and $R_2$ comprising an outlet;

the first and second plunger movable into and out of receptacle $R_1$ and, respectively $R_2$;

a static mixer comprising an inlet and an outlet; and the outlet of each receptacle $R_1$ and $R_2$ connected in fluid communication with the inlet of the static mixer.

Expedient embodiments of the inventive dispenser according to the third embodiment are characterized in that the dispenser comprises a frame and a lid;

the frame and lid are mechanically coupled through a hinge;

the dispenser comprises a lock for attaching the lid to the frame in a form-fit disposition;

the dispenser comprises a lock for attaching the lid to the frame in a force-fit disposition;

the static mixer comprises a first and second channel;

the first channel comprises an inlet and an outlet and a principal axis extending from the inlet to the outlet;

the first channel has cross-sections of constant or varying size with rectangular, semi-spherical or semi-elliptical shape;

the first channel has cross-sections with constant or varying width;

the first channel is equipped with 4 to 40 deflectors;

the deflectors of the first channel are configured in a pattern corresponding to the teeth of two interdigitate facing combs;

each deflector of the first channel intersects the principal axis of the first channel;

each deflector of the first channel protrudes into the first channel by a length of 40% to 80% of the width of the first channel;

each deflector of the first channel protrudes into the first channel by a length of 45% to 80% of the width of the first channel;

each deflector of the first channel protrudes into the first channel by a length of 45% to 55% of the width of the first channel;

the second channel comprises an inlet and an outlet and a principal axis extending from the inlet to the outlet;

the second channel has cross-sections of constant or varying size with rectangular, semi-spherical or semi-elliptical shape;
the second channel has cross-sections with constant or varying width;
the second channel is equipped with 4 to 40 deflectors;
the deflectors of the second channel are configured in a pattern corresponding to the teeth of two interdigitate facing combs;
each deflector of the second channel intersects the principal axis of the second channel;
each deflector of the second channel protrudes into the first channel by a length of 40% to 80% of the width of the second channel;
each deflector of the second channel protrudes into the first channel by a length of 45% to 80% of the width of the second channel;
each deflector of the second channel protrudes into the first channel by a length of 45% to 55% of the width of the second channel;
the first channel is meander-like shaped;
the second channel is meander-like shaped;
the first channel is arranged in the frame;
the second channel is arranged in the lid;
the dispenser is configured for juxtaposition of the first and second channel;
in form-fit disposition of the frame and lid the first and second channel are juxtaposed;
in juxtaposition the principal axes of the first and second channel are collinear;
the first and second channel have a meander-like shape and are configured such that in juxtaposition the first channel is congruent to the second channel when mirrored along two directions that are perpendicular to each other and the principal axis of the first channel;
the first and second channel have a meander-like shape and are configured such that in juxtaposition the second channel is congruent to the first channel when mirrored along two directions that are perpendicular to each other and the principal axis of the second channel;
the first and second plunger are each configured as piston;
the first and second plunger are each configured as diaphragm;
the first and second plunger are each configured as plate diaphragm;
the first and second plunger are each configured as spherical diaphragm;
the first and second receptacle $R_1$ and $R_2$ have inner surfaces $S_1$ and, respectively $S_2$, and the first and second plunger have operative surfaces $F_1$ and $F_2$ facing receptacle $R_1$ and, respectively $R_2$ with $0.18 \cdot S_1 \leq F_1 \leq S_1$ and $0.18 \cdot S_2 \leq F_2 \leq S_2$;
the first and second receptacle $R_1$ and $R_2$ have principal axes with length $L_1$ and, respectively $L_2$; and cross sections perpendicular to said principal axes with average equivalent diameter $\overline{D}_1$ and, respectively $\overline{D}_2$ with $2 \leq L_1/\overline{D}_1 \leq 12$ and $2 \leq L_2/\overline{D}_2 \leq 12$.
the first and second plunger are movable in a direction perpendicular to the principal axis of $R_1$ and, respectively $R_2$;
receptacle $R_1$ and $R_2$ are configured as cavities;
receptacle $R_1$ and/or receptacle $R_2$ are arranged in the frame;
receptacle $R_1$ and/or receptacle $R_2$ are each arranged in the lid;
receptacle $R_1$ and $R_2$ each comprise a first and second part arranged in the frame and, respectively in the lid;
in a mixer configuration wherein the lid is force-fit attached to the frame the first and second channel are arranged between receptacle $R_1$ and $R_2$;
in a mixer configuration wherein the lid is force-fit attached to the frame the first and second channel axes are collinear to the principal axes of receptacle $R_1$ and $R_2$;
the dispenser comprises a closing and opening valve for closing and opening the outlet of the static mixer;
the closing and opening valve is configured to assume a closing position under external pressure below a preset first threshold pressure and an opening position under external pressure above a preset second threshold pressure;
the closing and opening valve is configured as diaphragm;
the closing and opening valve is configured as plate diaphragm;
the closing and opening valve is configured as spherical diaphragm;
the dispenser comprises at least one retainer chamber connected in fluid communication with the static mixer upstream from the outlet;
the dispenser comprises at least one retainer chamber connected in fluid communication with the static mixer proximal to and upstream from the outlet
the dispenser comprises at least one retainer chamber connected in fluid communication with the static mixer upstream from the closing and opening valve;
the dispenser comprises at least one retainer chamber connected in fluid communication with the static mixer proximal to and upstream from the closing and opening valve;
the dispenser comprises a hydraulic transmission;
the hydraulic transmission comprises a first cylinder with a first piston, a second cylinder with a second piston and a first and second spindle (ball screw) coupled to the first and, respectively second piston;
the hydraulic transmission comprises a first cylinder with a first piston, a second cylinder with a second piston and a spindle (ball screw) coupled to the first and second piston through a yoke;
the hydraulic transmission comprises a hydraulic fluid;
the hydraulic transmission comprises a hydraulic oil;
the dispenser comprises a mechanical transmission;
the mechanical transmission is configured as planetary gear and comprises a sun gear and a stationary carrier with two or four planet gears;
the sun gear and each of the planet gears have $N_S$ and, respectively $N_P$ teeth with $N_P \geq N_S$;
the mechanical transmission is configured as planetary gear with a stationary carrier with a first and second planet gear and a first and second spindle (ball screw);
the first and second planet gear are coupled to the first and, respectively second plunger through the first and, respectively second spindle (ball screw);
the mechanical transmission is configured as planetary gear with a stationary carrier with a first, second, third and fourth planet gear and a first, second, third and fourth spindle (ball screw);
the first and second planet gear are coupled to the first plunger through the first and, respectively second spindle (ball screw); and/or
the third and fourth planet gear are coupled to the second plunger through the third and, respectively fourth spindle (ball screw).

Hereinafter the invention is further elucidated with the aid of figures showing:

DETAILED DESCRIPTION OF ADVANTAGEOUS EMBODIMENTS OF THE INVENTION

Figure 1:
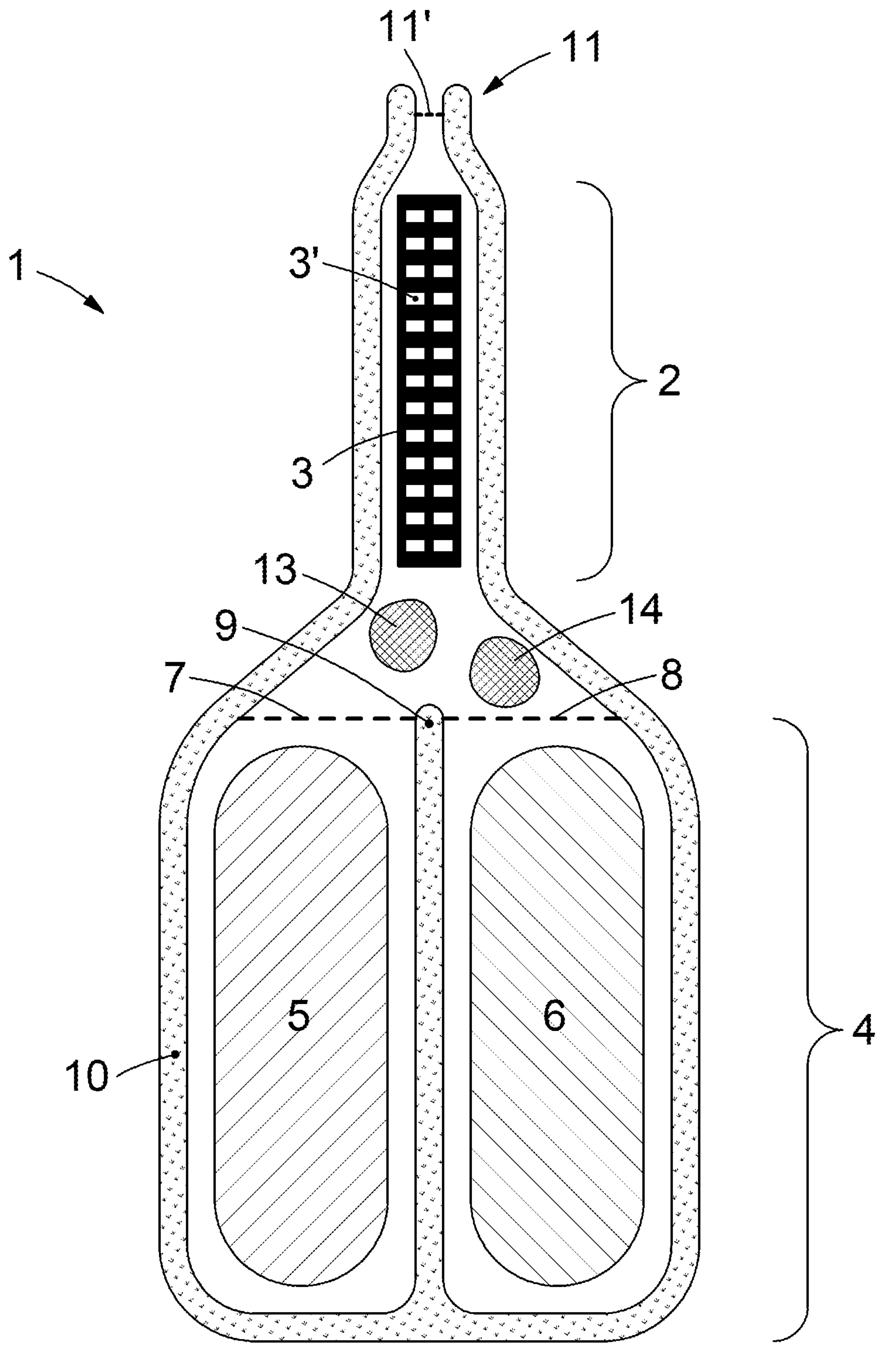
FIG. 1 is a schematic representation of a an exemplary container with a reservoir for two viscous materials.

FIG. 1 depicts a plan cut-away view of an inventive container 1 with a mixing tube 2, an outlet 11 and a reservoir 4. Mixing tube 2 provides a conduit from reservoir 4 to outlet 11. A shield 3 with a plurality of apertures 3' is arranged inside of mixing tube 2. Reservoir 4 contains two viscous materials 5 and 6. Container 1 comprises a sleeve comprised of one or two films 13, 14 of polymeric materials. In an expedient embodiment of container 1 the sleeve has a circumferential adhesive or seal seam 10. Adhesive or seal seam 10 bounds the sleeve and imparts increased stiffness to container 1. Reservoir 4 is partitioned into two regions, respectively chambers by a further adhesive or seal seam 9 with each of materials 5 and 6 contained in a separate chamber. In an advantageous embodiment of the inventive container 1 each of the chambers containing one of materials 5 and 6 is sealed by a breakable adhesive or seal seam 7 and 8. Each of breakable adhesive or seal seams 7 and 8 is arranged between one of the chambers containing one of the materials 5, 6 and mixing tube 2.

In an alternative embodiment of container 1 each of materials 5 and 6 is encased in a separate breakable sleeve—not shown in FIG. 1. In this alternative embodiment of container 1 the adhesive or seal seam 9 and the breakable adhesive or seal seams 7 and 8 are not required and omissible.

Expediently, outlet 11 is sealed with a breakable adhesive or seal seam 11', which shields an inner volume of container 1 from the ambient atmosphere.

For mixing and dispensing of materials 5 and 6 container 1 is inserted in a dispenser and mechanical pressure is exerted on reservoir 4. When a certain pressure threshold is exceeded the breakable sleeves encasing each of materials 5 and 6 or alternatively adhesive or seal seams 7 and 8 burst and materials 5 and 6 flow through mixing tube 2 toward outlet 11.

The dispenser comprises a mixer (see FIG. 7 to 10) configured to accommodate mixing tube 2 and a therein contained shield 3 such that the mixer and the thereto form-fit mated mixing tube 2 and shield 3 bound a fluid-conducting mixing chamber. The pressurized materials 5, 6 squeeze the sleeve of mixing tube 2 against an inner wall of the mixing chamber. The inner wall of the mixing chamber is shaped in such manner that its contour in conjunction with the apertures 3' of shield 3 bound a fluid conduit with multiple redirections ensuring intensive mixing of materials 5 and 6.

Figure 2:
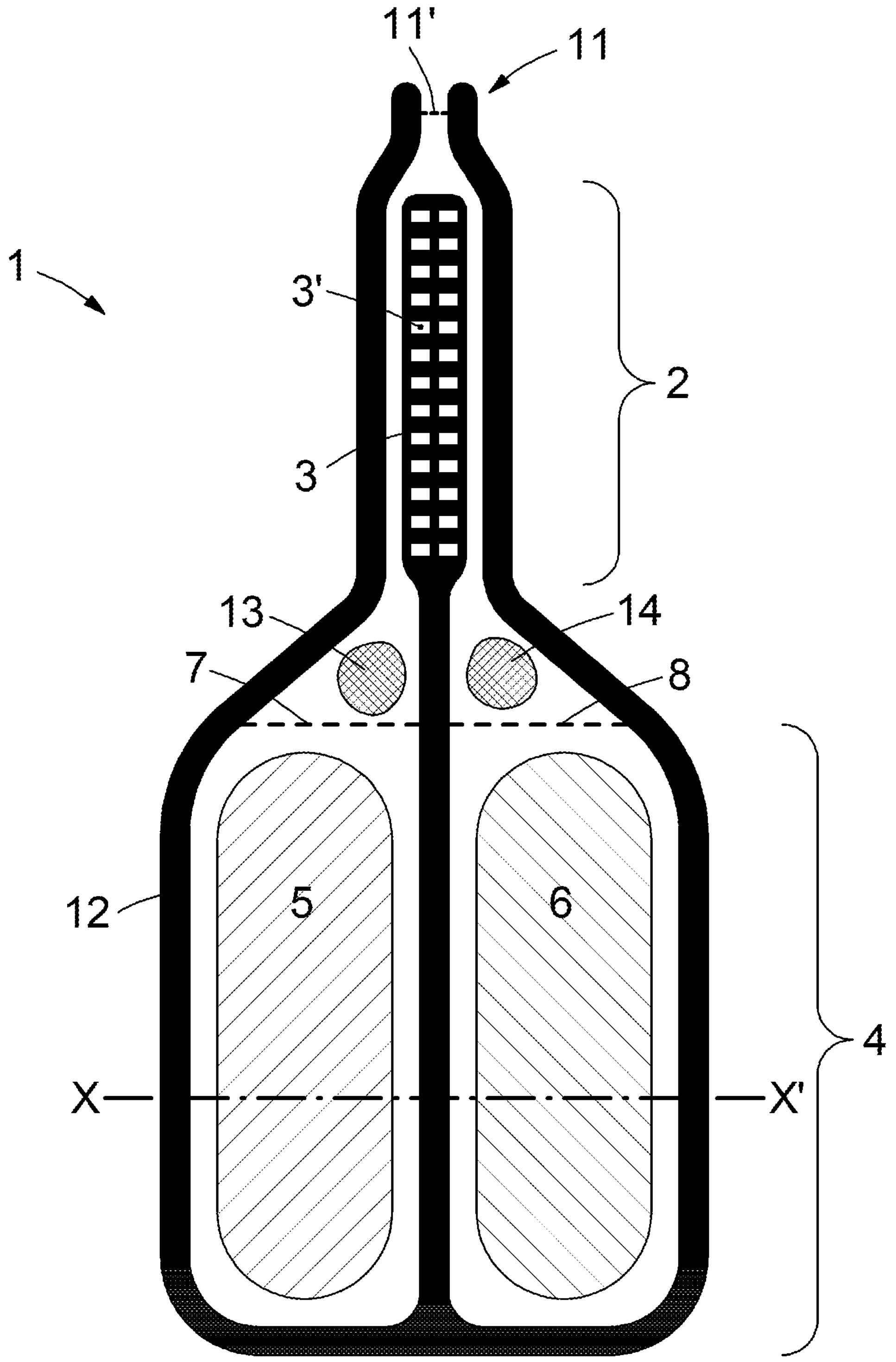
FIG. 2 is a schematic representation of an exemplary container with a one-piece frame.

FIG. 2 shows a further expedient embodiment of inventive container 1 with a stabilizing frame 12. The further reference signs of FIG. 2 have the same meaning as explained above in the context of FIG. 1. Preferably frame 12 consist of a sheet of polymeric material with a thickness of 0.3 to 3 mm.

In an advantageous embodiment frame 12 and shield 3 are configured as a one-piece entity and are preferably prepared, e.g. punched from one piece of a sheet-like material.

Figure 3:
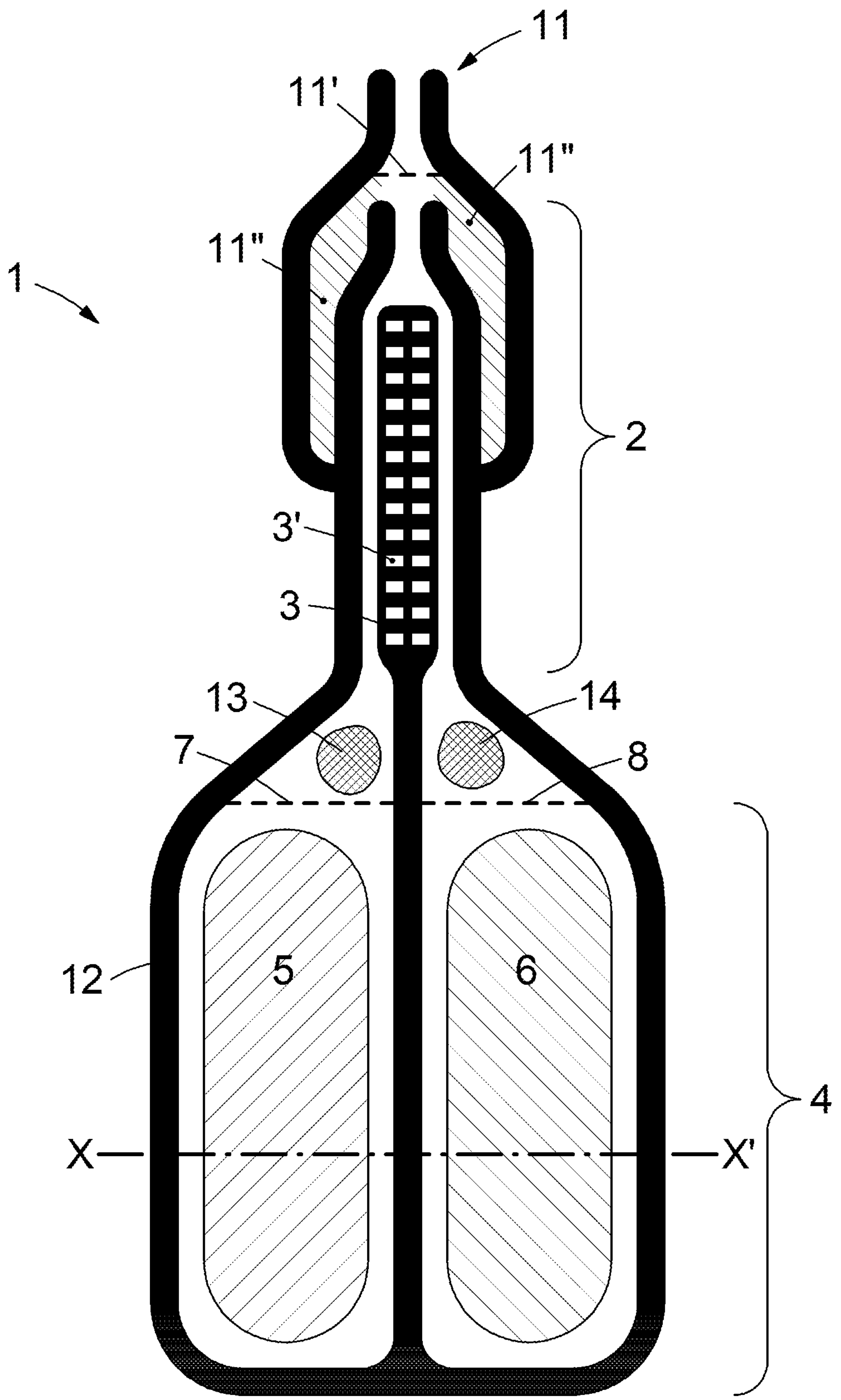
FIG. 3 is a schematic representation of a plan cutaway view of an exemplary container with retainer chambers.

FIG. 3 shows an advantageous embodiment of the inventive container 1 with an outlet 11 sealed with a closure 11' configured as breakable adhesive or seal seam and two retainer chambers 11". The further reference signs of FIG. 3 have the same meaning as explained above in the context of FIGS. 1 and 2. An aperture of each retainer chamber 11" is situated between the closure 11' of outlet 11 and mixing tube 2. Each retainer chamber 11" serves as receptacle for an initial volume part of inadequately mixed materials 5, 6. In order to dispense a mixture of materials 5, 6 container 1 is inserted in a dispenser and pressure exerted on reservoir 4, such that breakable adhesive or seal seams 7, 8 or alternatively breakable encasings of materials 5, 6 burst and materials 5, 6 flow through a mixing chamber bound by the dispenser and thereto form-fit mated mixing tube 2 and shield 3 (see FIG. 9). Thereby, a first, respectively initial volume part of materials 5, 6 may be inadequately mixed. Upon streaming through the mixing chamber, respectively mixing tube 2 materials 5, 6 flow toward outlet 11, are retained by closure 11' and redirected into retainer chambers 11". Once retainer chambers 11" are filled the pressure in the volume region between mixing tube 2 and closure 11' rises continuously until it exceeds the burst pressure of closure 11'. When its burst pressure is exceeded closure 11' opens and the mixture of materials 5, 6 exit through outlet 11. Preferably, retainer chambers 11" are situated peripherally relative to the volume region between mixing tube 2 and outlet 11.

Particularly, a surface normal vector of an aperture bound by each retainer chamber 11" is directed in such manner that an angle between a straight line extending from the mixing to chamber, respectively mixing tube 2 to outlet 11 and the surface normal vector is in the range from 60 to 120 degree. This configuration of retainer chambers 11" ensures that the therein contained material is not washed out by freshly supplied material flowing out from the mixing chamber, respectively mixing tube 2.

Figure 4:
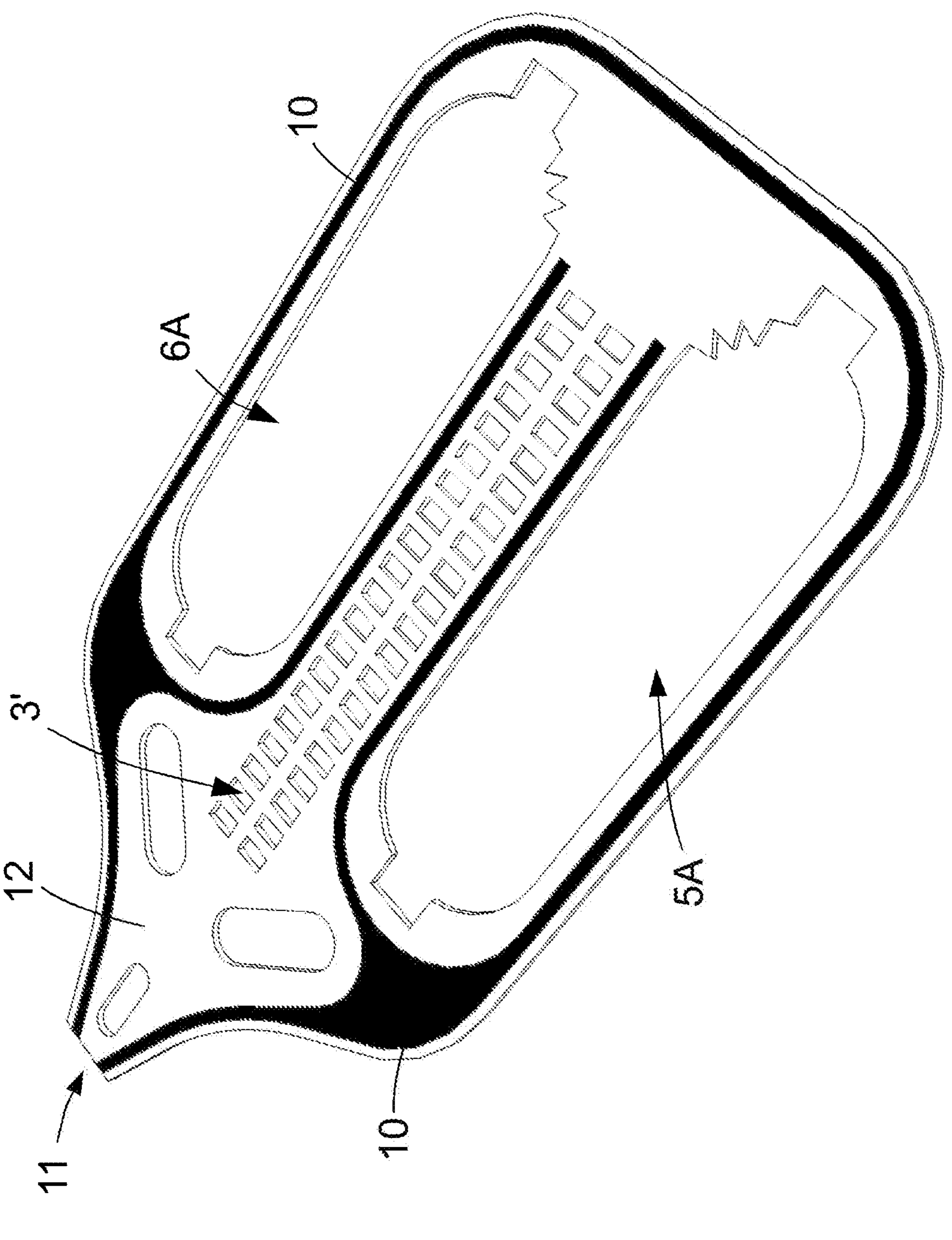
FIG. 4 is a schematic representation of a frame of an exemplary container comprising a multitude of apertures for a mixing tube.

FIG. 4 shows a frame 12 for the inventive container with a contiguous adhesive or seal seam 10 with an opening for an outlet 12, a multitude of apertures 3' for mixing and a first and second aperture 5A and 6A for accommodation of a first and, respectively second viscous material. A major portion of the perimeter of aperture 5A and 6A is enclosed by adhesive or seal seam 10. Seam 10 also extends alongside the multitude of apertures 3' and coincides with the boundaries of the mixing tube. Seam 10 is patterned in such manner, that the mixing is arranged between apertures 5A and 6A.

As depicted in FIG. 4 frame 12 may comprise additional apertures for two retainer chambers and a closing and opening valve. Expediently, part of the perimeter of apertures 5A and 6A may be shaped sawtooth-like in order to facilitate breakage of sleeves or tubes encasing the first and second viscous material.

Figure 5:
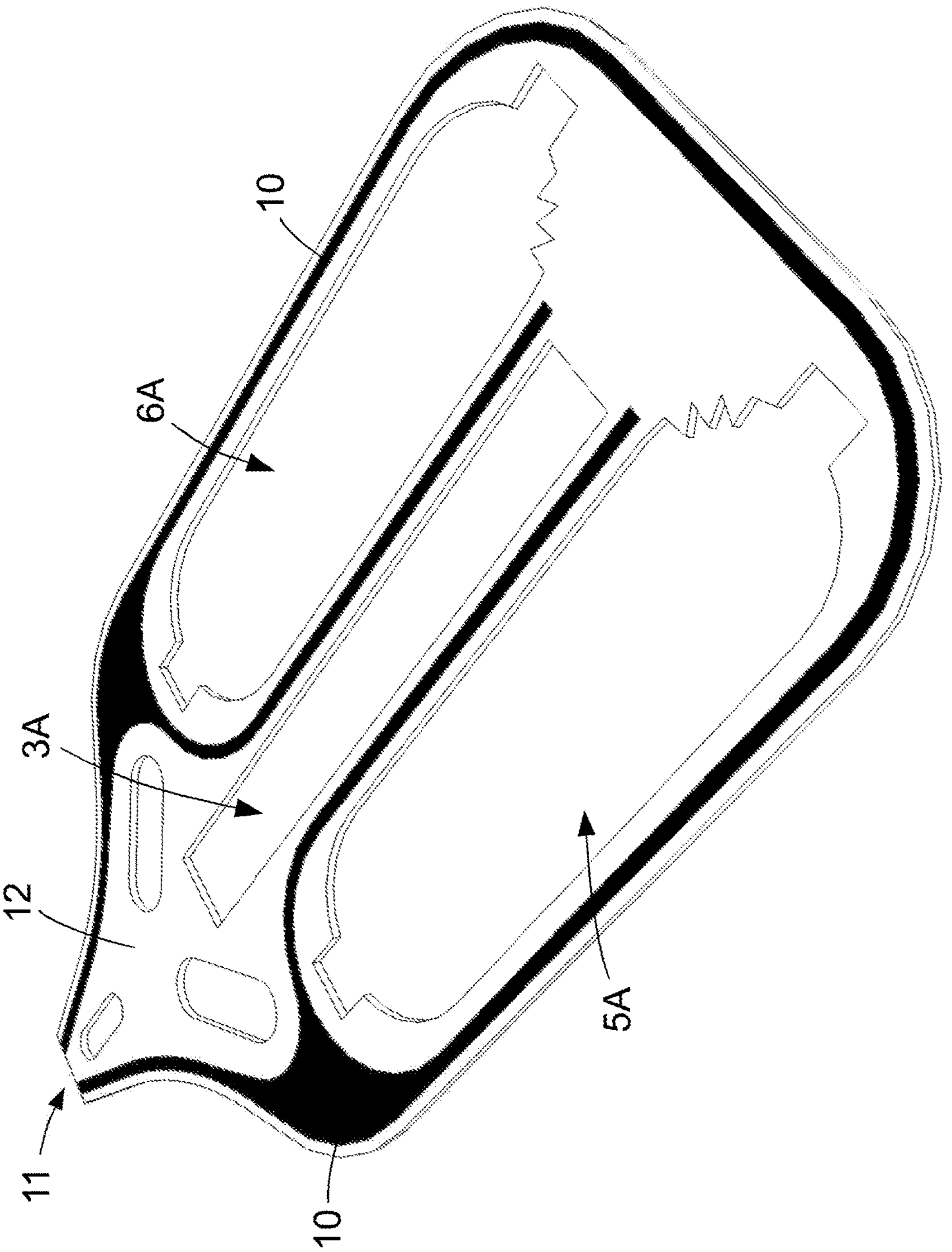
FIG. 5 is a schematic representation ofa frame of an exemplary container with one aperture for a mixing tube.

FIG. 5 shows a frame 12 for the inventive container with a contiguous adhesive or seal seam 10 with an opening for an outlet 12, one aperture 3A for mixing and a first and second aperture 5A and 6A for accommodation of a first and, respectively second viscous material. The remaining reference signs of FIG. 5 designate the same features and have the same meaning as afore-expounded in conjunction with FIG. 4.

Figure 6:
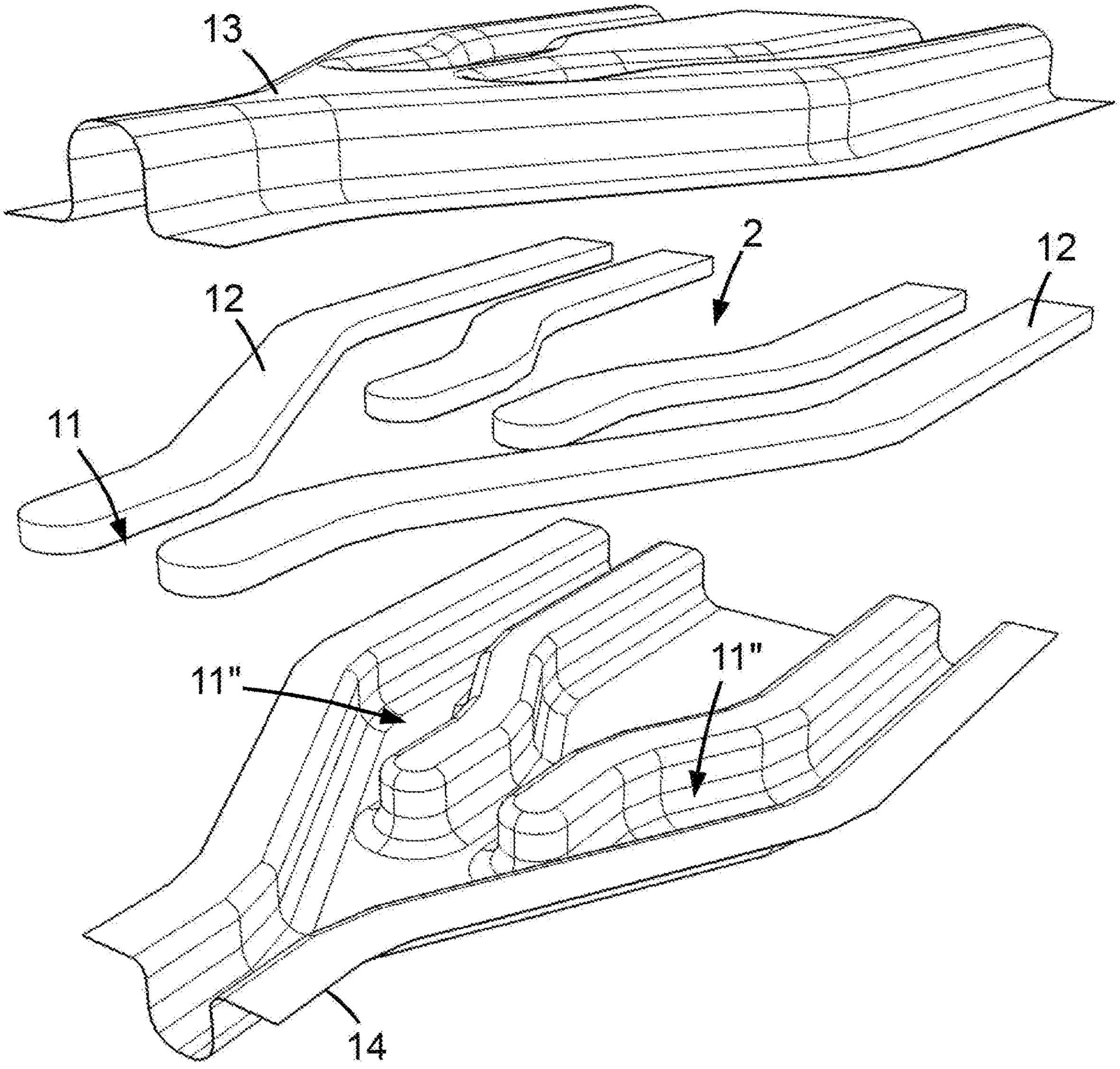
FIG. 6 is a schematic representation of a perspective partial view of an exemplary container with retainer chambers.

FIG. 6 depicts a schematic partial exploded view of the container of FIG. 3 comprising a one-piece frame 12 and outlet 11. The sleeve of the container comprises a first (upper) film 13 and a second (lower) film 14 that are joined to a first and, respectively second, mutually opposite surface of frame 12 through adhesive or seal seams. Frame 12 in conjunction with films 13 and 14 bounds a mixing chamber, respectively mixing tube 2 and two retainer chambers 11". The two retainer chambers 11" are situated sideways of mixing tube 2 and each comprise an aperture arranged between mixing tube 2 and outlet 11.

Figure 7:
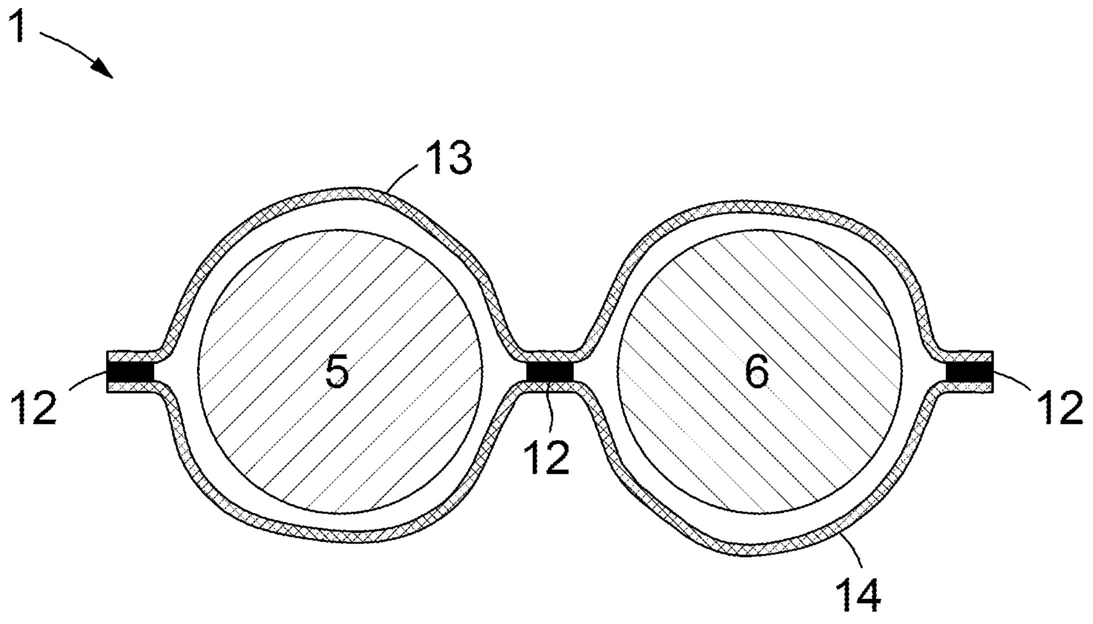
FIG. 7 is a schematic representation ofa cross section of an exemplary container comprising a frame.

FIG. 7 depicts a cross section of container 1 presented in FIGS. 2 and 3 along a transverse cut referenced by X, X'. In the embodiment shown in FIG. 7 the sleeve of container 1 is comprised of two films 13 and 14 joined to a first and, respectively second, mutually opposite surface of frame 12 through adhesive or seal seams. In another expedient embodiment the sleeve of container 1 consists of a one-piece film folded around frame 12.

Figure 8:
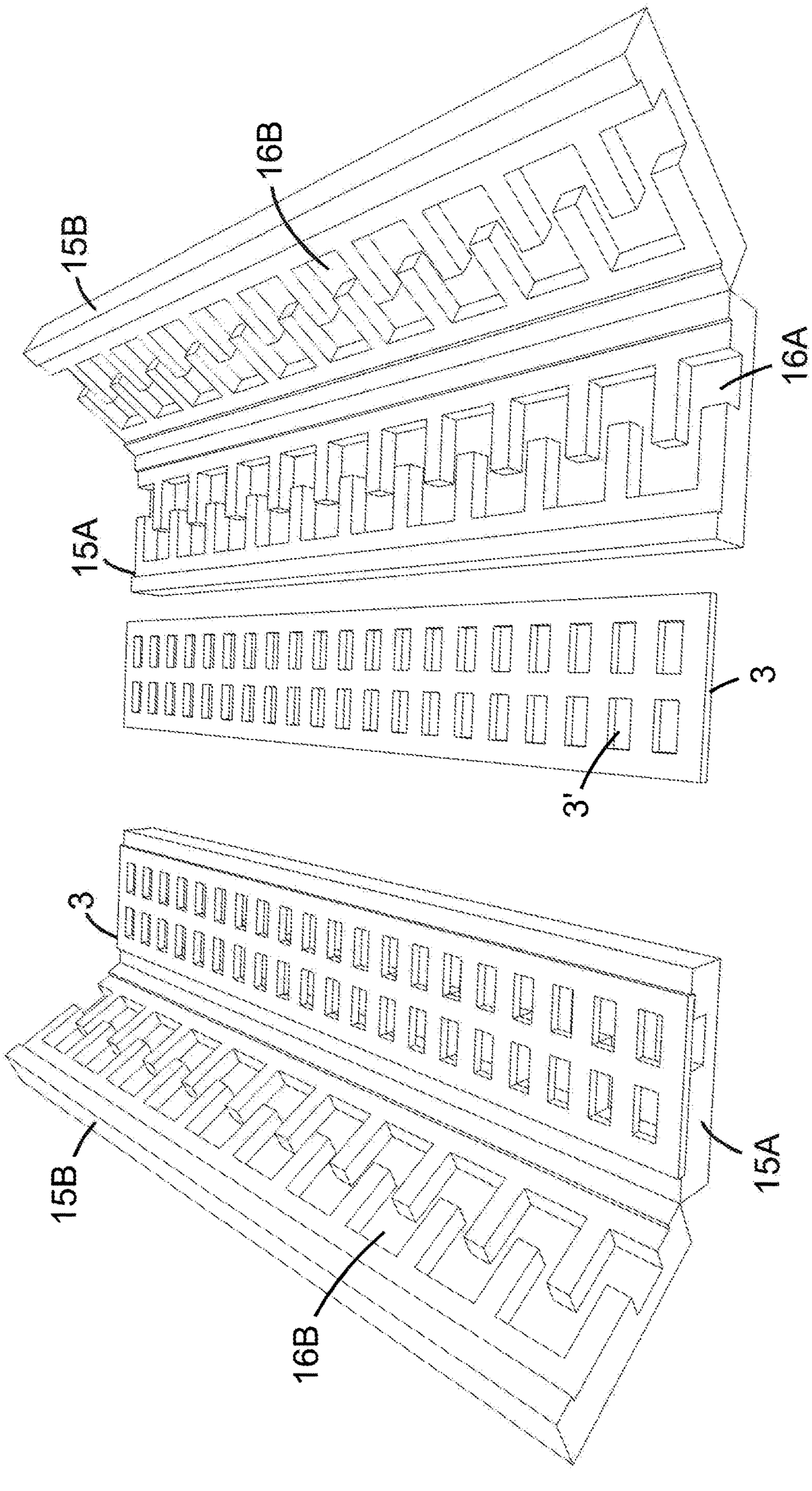
FIG. 8 is a schematic representation ofa perspective view of an exemplary static mixer with essentially straight mixing path.

FIG. 8 shows a first and second perspective view of a mixer of the inventive dispenser with therein inserted and, respectively sideways arranged shield 3. The mixer comprises a first mixer part 15A with channel 16A and a second mixer part 15B with channel 16B. First and second mixer part 15A and 15B are shaped in such manner that they are form-fit mateable with shield 3 and the sleeve—not shown in FIG. 8—of the mixing tube of the inventive container.

Each of channels 16A and 16B is meander-like shaped and when arranged in facing juxtaposition has opposite phase course with a plurality of mutually congruent sections. In the present invention the term "congruent section" designates a design, respectively shape of channels 16A and 16B which ensures that in opposite juxtaposition of the first and second mixer part 15A and 15B the apertures of channel 16A and 16B partially overlap. Preferably, channel 16A and 16B have the same contour, respectively the same shape such that when arranged in facing juxtaposition their course has opposite phase and their apertures are partially congruent at a plurality of intersection points. Further, channels 16A and 16B are shaped in such manner that their congruent sections are also congruent to apertures 3' of shield 3 and the first and second mixer part 15A and 15B in conjunction with the form-fit mated shield 3 and the sleeve—not shown in FIG. 8—of a mixing tube of the inventive container bound a fluid-conducting mixing chamber.

Channels 16A and 16B shown in FIG. 8 each comprise 10 meander cells. In the present invention the term "meander cell" designates one repeat unit, respectively one undulation of channels 16A and 16B. The meander cells of channels 16A and 16B can have varying shapes. Preferably, the meander cells of channel 16A and independently of channel 16B have the same shape such that the shape of each of channels 16A and 16B is partially periodic.

Figure 9:
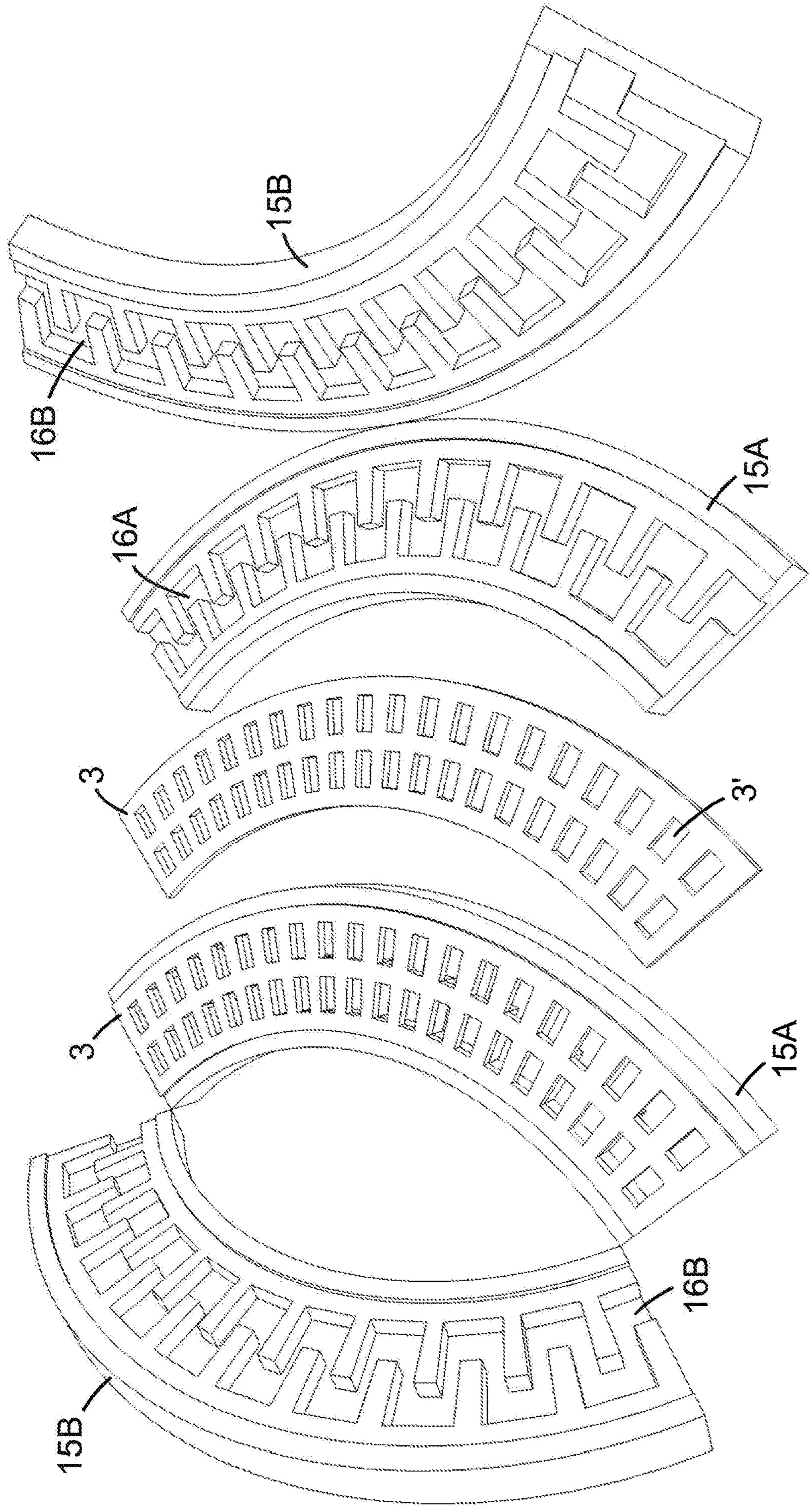
FIG. 9 is a schematic representation ofa perspective view of an exemplary static mixer with essentially arc-shaped mixing path.

FIG. 9 depicts an alternative embodiment of the inventive shield 3 and first and second mixer part 15A and 15B with channels 16A and, respectively 16B that are shaped in such manner that mixer parts 15A and 15B in conjunction with the form-fit mated shield 3 (and mixing tube 2) bound a fluid-conducting mixing chamber having an arc-shaped central axis.

Figure 10:
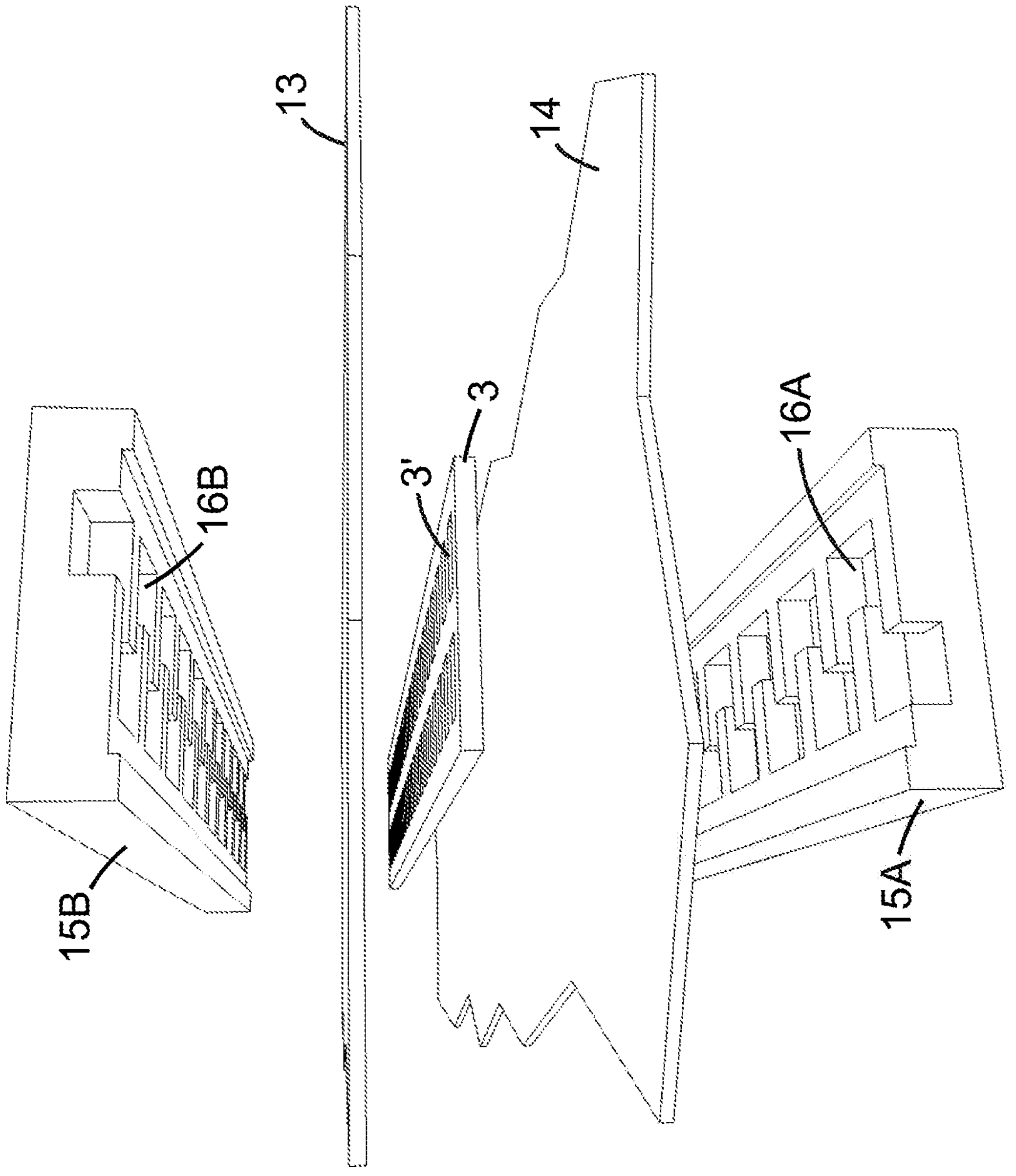
FIG. 10 is a schematic representation of a perspective view of an exemplary static mixer with sleeve films of a mixing tube.

FIG. 10 shows a perspective exploded view of mixer parts 15A and 15B with interposed sections of films 13, 14 constituting the sleeve of the inventive container and shield 3 arranged between films 13 and 14.

Figure 11:
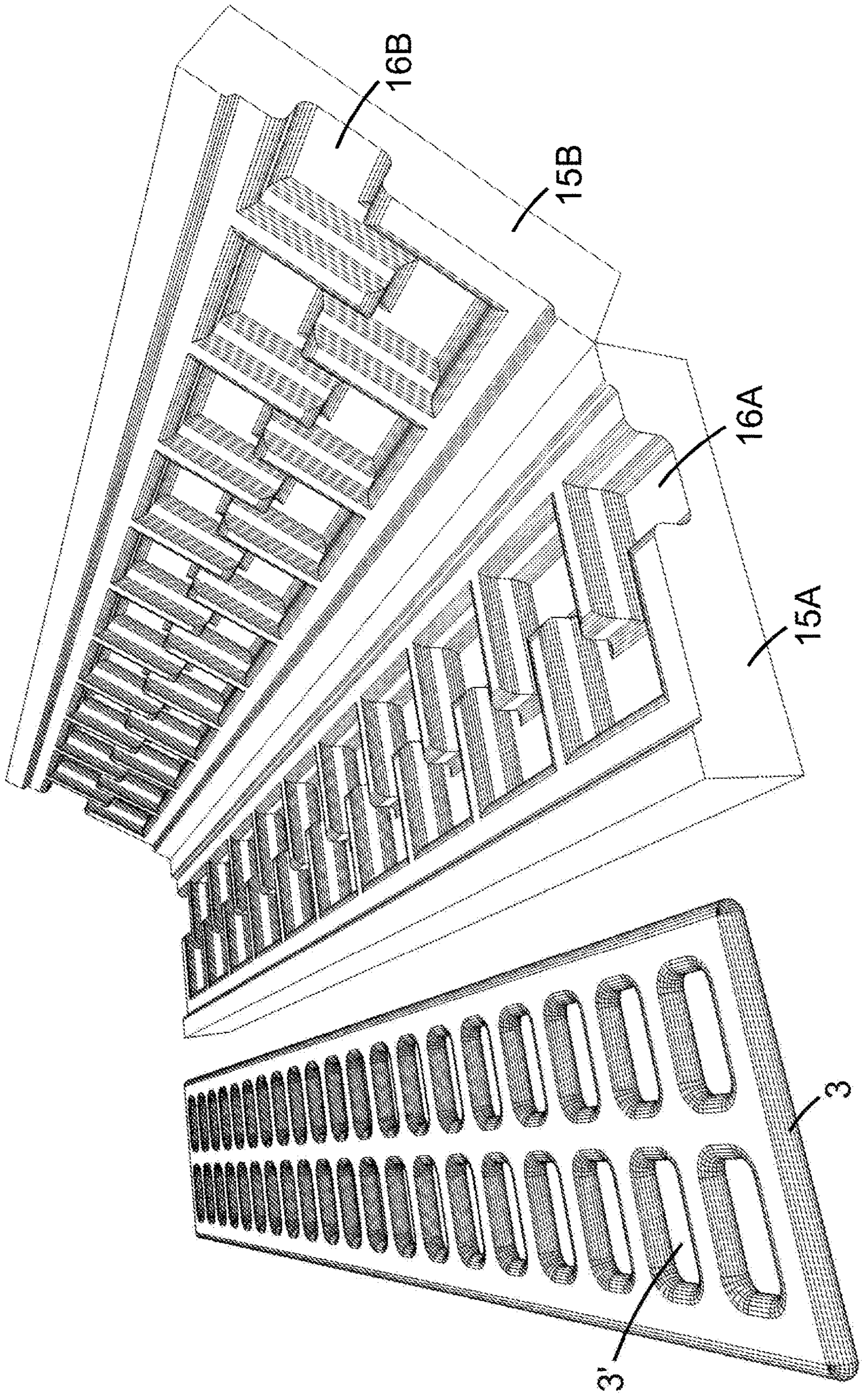
FIG. 11 is a schematic representation of an exemplary static mixer with rounded edges.

FIG. 11 shows a perspective view of a preferred embodiment of shield 3 and mixer parts 15A and 15B, wherein edges which contact the sleeve film of the mixing tube of the inventive container and/or the viscous materials are rounded or chamfered.

Figure 12:
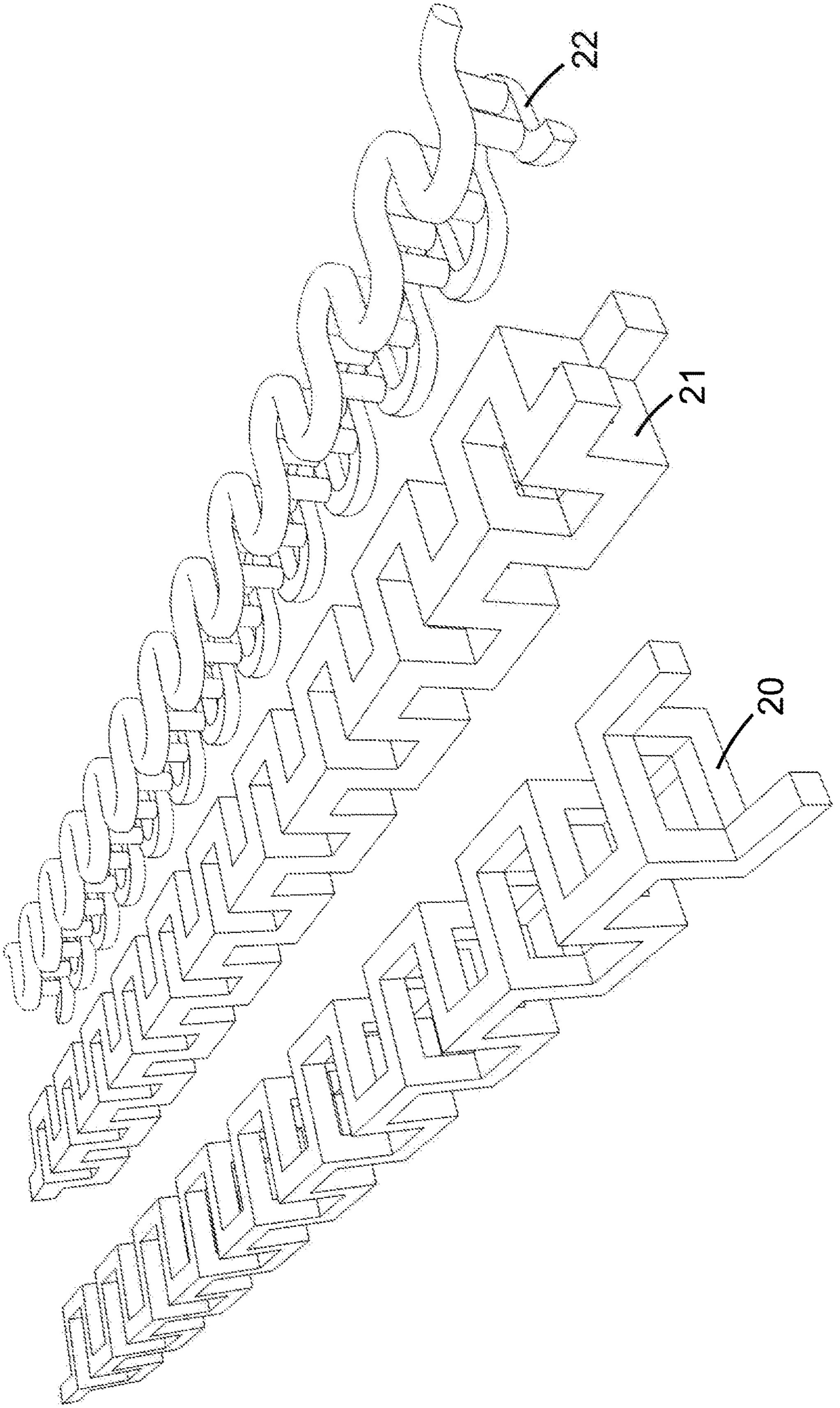
FIG. 12 is a schematic representation of a perspective view of exemplary fluid-conducting mixing chambers of diversely shaped mixers.

FIG. 12 shows perspective views of fluid-conducting mixing chambers 20, 21 and 22 bound by the first and second inventive mixer part and form-fit mated shield (and mixing tube). Depending on the design of the first and second mixer part and the shield the fluid-conducting mixing chambers 20, 21 and 22 have rectangular, rounded or cylindrical shape and comprise one or more sections each comprised of two mixing cells and optionally one additional mixing cell, such that the total number of mixing cells is even or uneven.

Figure 13:
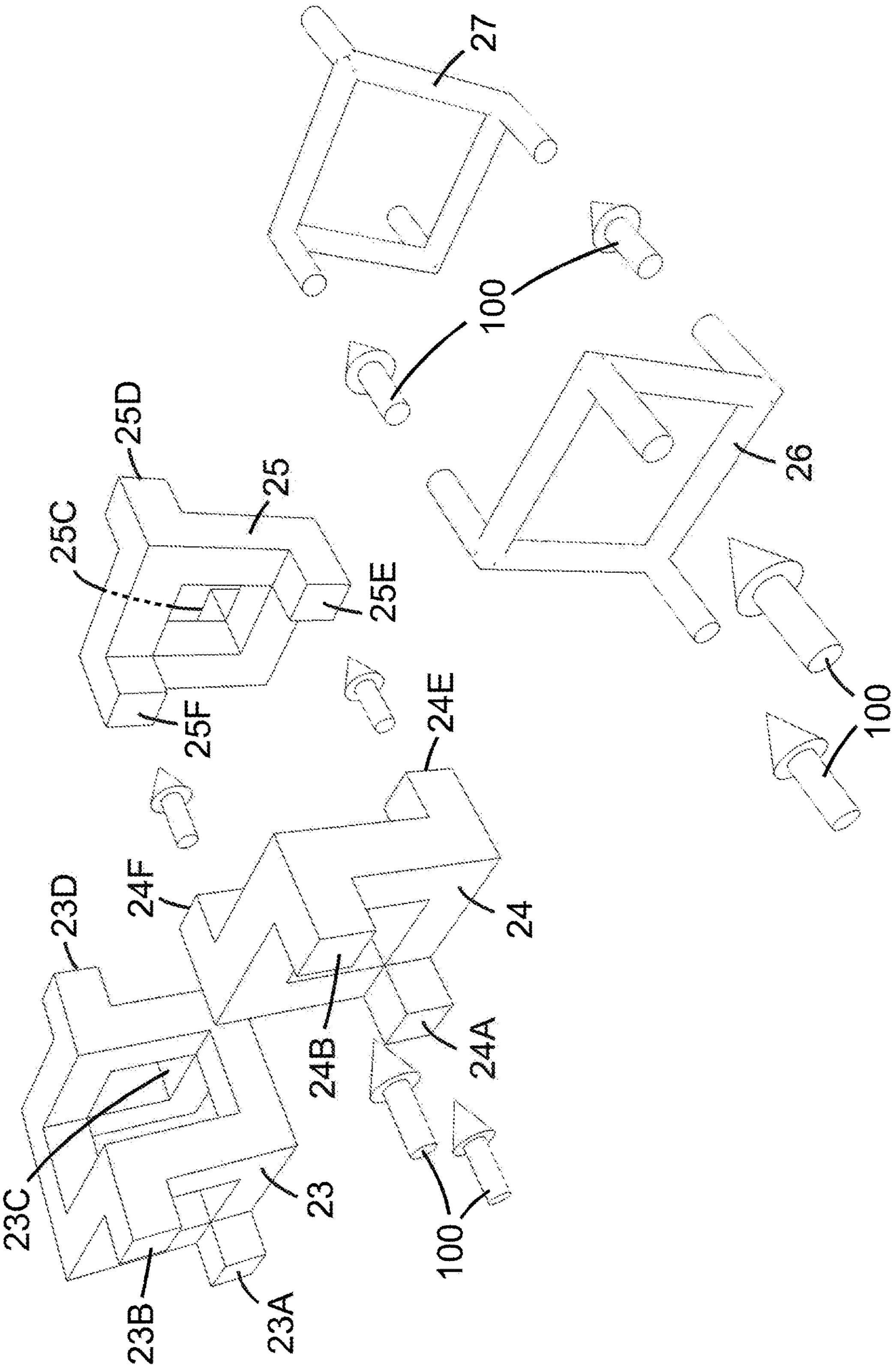
FIG. 13 is a schematic representation ofa perspective close-up view of an exemplary mixing cell.

FIG. 13 shows a perspective view of a section 23 of a mixing chamber bound by the inventive mixer parts and the thereto form-fit mated mixing tube and shield of the inventive container. Section 23 comprises a first and second inlet 23A and 23B as well as a first and second outlet 23C and 23D. Section 23 is comprised of two consecutive mixing cells 24 and 25. Mixing cell 24 has two inlets 24A and 24B that are identical to inlets 23A and, respectively 23B. Mixing cell 24 further comprises two outlets 24E and 24F, wherein the length and shape of the fluid duct from inlet 24A to each outlet 24E and 24F is similar and preferably the same. Likewise the length and shape of each fluid duct from inlet 24B to each of outlets 24E and 24F is similar and preferably the same. Due to the similarity or indistinguishability of the fluid ducts a material stream entering through each of inlets 24A or 24B splits into two streams of practically equivalent volume flowing towards each of outlets 24E and 24F. Thereby, before each of outlets 24E and 24F a partial fluid stream from inlet 24A is united with a partial fluid stream from inlet 24B.

Outlets 24E and 24F communicate with inlets 25E and 25F of subsequent mixing cell 25. Mixing cell 25 further comprises two outlets 25C and 25D that are identical to outlets 23C and, respectively 23D, wherein the length and shape of fluid ducts from inlet 25E to each of outlets 25C and 25D is similar and preferably the same. Likewise the length and shape of fluid ducts from inlet 25F to each of outlets 25C and 25D is similar and preferably identical. Due to the similarity or indistinguishability of the fluid ducts a material stream entering through each of inlets 25E or 25F splits into two streams of practically equivalent volume flowing towards each of outlets 25C and 25D. Thereby, before each of outlets 25C and 25D a partial fluid stream from inlet 25E is united with a partial fluid stream from inlet 25F.

In FIG. 13 stream arrows 100 illustrate material streams. Likewise the schematic depiction of material flow paths as cylindrical manifolds 26 and 27 is intended to aid visual perception.

Based on the splitting of each a first and second inflowing material stream into two partial streams and subsequent merging of a partial stream from the first inflowing material stream with a partial stream from the second inflowing material stream intensive mixing of two viscous materials can be achieved within a limited number of sequentially arranged and connected mixing cells 24, 25.

The above described mixing method does not rely on an even split of the inflowing material streams. Intensive mixing can also be achieved with a split at a volumetric ratio of e.g. 60:40. Neither is it required that the mixing cells of the fluid-conducting mixing chamber have the same shape or dimensions.

REFERENCE SIGNS

1 . . . container
2 . . . mixing tube
3 . . . shield
3' . . . apertures for mixing
3A . . . single aperture for mixing
4 . . . reservoir
5 . . . viscous material
5A . . . aperture for viscous material
6 . . . viscous material
6A . . . aperture for viscous material
7 . . . breakable adhesive or seal seam
8 . . . breakable adhesive or seal seam
9 . . . adhesive or seal seam
10 . . . adhesive or seal seam
11 . . . outlet
11' . . . breakable adhesive or seal seam
11" . . . retainer chamber
12 . . . frame
13 . . . sleeve film
14 . . . sleeve film
15A . . . mixer part
15B . . . mixer part
16A . . . channel
16B . . . channel
20 . . . fluid-conducting mixing chamber
21 . . . fluid-conducting mixing chamber
22 . . . fluid-conducting mixing chamber
23 . . . section of fluid-conducting mixing chamber
23A . . . inlet of section 23
23B . . . inlet of section 23
23C . . . outlet of section 23
23D . . . outlet of section 23
24 . . . mixing cell
24A . . . inlet of mixing cell 24
24B . . . inlet of mixing cell 24
24E . . . outlet of mixing cell 24
24F . . . outlet of mixing cell 24
25 . . . mixing cell
25E . . . inlet of mixing cell 25
25F . . . inlet of mixing cell 25
25C . . . outlet of mixing cell 25
25D . . . outlet of mixing cell 25
26 . . . fluid duct in mixing cell 24
27 . . . fluid duct in mixing cell 25
100 . . . stream arrow

The invention claimed is:

1. A container comprising a reservoir and a mixing tube, the mixing tube comprises a sleeve consisting of one or more films made of polymeric materials, wherein said container comprises a stabilizing frame with m apertures arranged within the mixing tube or the mixing tube contains a shield with m apertures and m is in the range from 1 to 160, and wherein said reservoir comprises a first viscous material is encased within a first breakable encasing and a second viscous material encased within a second breakable encasing, with said first breakable encasing disposed within a first chamber and said second breakable encasing disposed within a second chamber, said breakable encasings having a burst pressure of ≥1.0 bar and the mixing tube is arranged between the first and second chamber.

2. The container of claim 1, wherein said container comprises a first and second polymeric film joined to a first and, respectively second surface of said stabilizing frame each by one or more adhesive or seal seams.

3. The container of claim 2, wherein each the first and second polymeric film have an elongation at break of 10% to 700%.

4. The container according to claim 1, wherein said frame and/or said shield have a thickness of 0.3 to 3 mm.

5. The container according to claim 1, wherein said frame and/or said shield are made from a polymeric film having an elastic modulus of 1500 to 4500 $N \cdot mm^{-2}$.

6. The container according to claim 1, wherein said frame comprises 4 to 160 apertures.

7. The container according to claim 1, wherein said frame comprises one aperture.

8. The container according to claim 1, wherein one, two or more of the viscous materials independently consist of 80 to 100 weight-% of silicone and 0 to 20 weight-% additives, based on the total weight of the respective material.

9. The container according to claim 1, wherein the container comprises at least one outlet equipped with a closure configured as a breakable adhesive or a seal seam.

10. A container comprising a reservoir comprising first and second coterminous chambers having a length, and one mixing tube comprising a shield, wherein the reservoir contains first and second viscous materials;

the container comprises a sleeve consisting of a first and second film made of polymeric materials, the container comprises a stabilizing frame, the first and second polymeric film are joined to a first and, respectively second surface of the stabilizing frame each by one adhesive or seal seam, the mixing tube comprises the sleeve formed of the first and second polymeric film joined by one or more straight adhesive or seal seams, the shield comprises m apertures arranged within the mixing tube with m in the range from 4 to 160, the stabilizing frame is made from a polymeric film having a thickness of 0.3 to 3 mm, and the first viscous material is encased within a first breakable tube and the second viscous material is encased within a second breakable tube, said breakable tubes having a burst pressure of ≥1.0 bar, said first breakable tube disposed within the first chamber and said second breakable tube disposed within the second chamber, and the mixing tube is arranged between and down the length of the first and second chamber.

11. The container according to claim 1, wherein the reservoir comprises a first and second chamber for a first and, respectively second viscous materials, said first and second chambers coterminous with each other and defining a length and the mixing tube is arranged between and down the length of the first and second chamber, and said mixing tube has a single inlet.

12. The container according to claim 1, wherein the container comprises m apertures arranged within the mixing tube with m apertures and m is in the range from 4 to 160, and said mixing tube has been form-fit into a shape consisting of a periodic, undulating shape; and wherein each of said viscous materials is encased in a breakable tube with a burst pressure of ≥1.0 bar.

13. The container according to claim 12, wherein the mixing tube has been form-fit to the stabilizing frame and defines at least two mixing cells, each mixing cell comprising a first and second inlet and a first and second outlet.

14. A container as claimed in claim 1 comprising a reservoir and a mixing tube, wherein the reservoir contains two or more viscous materials, and the mixing tube comprises a sleeve consisting of two or more films made of polymeric materials joined by one adhesive or seal seam;

wherein the mixing tube contains a shield with m apertures and m is in the range of from 4 to 160, the mixing tube and shield therein have been formed into meandering channels, and the meandering channels are U-shaped channels in facing juxtaposition of opposite phase course with a plurality of mutually congruent sections.

15. The container according to claim 13, wherein each of the viscous materials is encased in a breakable tube consisting of a film made from one or more polymeric materials and wherein each of a first and second end of the breakable tube is closed by a polymer or a metal clip.

16. The container according to claim 15, wherein the breakable tube has a burst pressure of ≥1 bar.

17. The container according to claim 14, wherein the viscous materials independently consist of 80 to 100 weight-% of silicone and 0 to 20 weight-% additives, based on the total weight of the respective material.

18. The container according to claim 14, wherein the sleeve of the mixing tube is made from a polymeric film having an elongation at break in the range from 10% to 700%.

19. The container according to claim 14, wherein the container sleeve in its entirety is made from a polymeric film having an elongation at break in the range from 10% to 700%.

20. The container according to claim 14, wherein, the reservoir comprises a first and second chamber for a first and, respectively second viscous material and the mixing tube is arranged between the first and second chamber, and the mixing tube has a single inlet.

21. A container as claimed in claim 1 disposed within a dispenser for the container, wherein the container comprises a reservoir and one mixing tube, the reservoir contains two viscous materials;

the mixing tube comprises a sleeve comprised of two films of polymeric materials joined by one adhesive or seal seam;

the mixing tube contains a shield with m apertures with 4≤m≤160;

the dispenser comprises one static mixer configured to accommodate the mixing tube of the container, the static mixer comprising a first mixer part with a first chamber and a second mixer part with a second channel, the first and second mixer part shaped in such manner that the mixing tube and a therein contained shield are form-fit mateable to the first and second mixer part and the first and second channel are meander-shaped.

22. A container according to claim 21, wherein the mixing tube contains a shield with m apertures and the mixing tube and shield therein have been formed into meandering channels.

23. A container according to claim 22, wherein the meandering channels are U-shaped channels in facing juxtaposition of opposite phase course with a plurality of mutually congruent sections.

* * * * *